Figure 1:
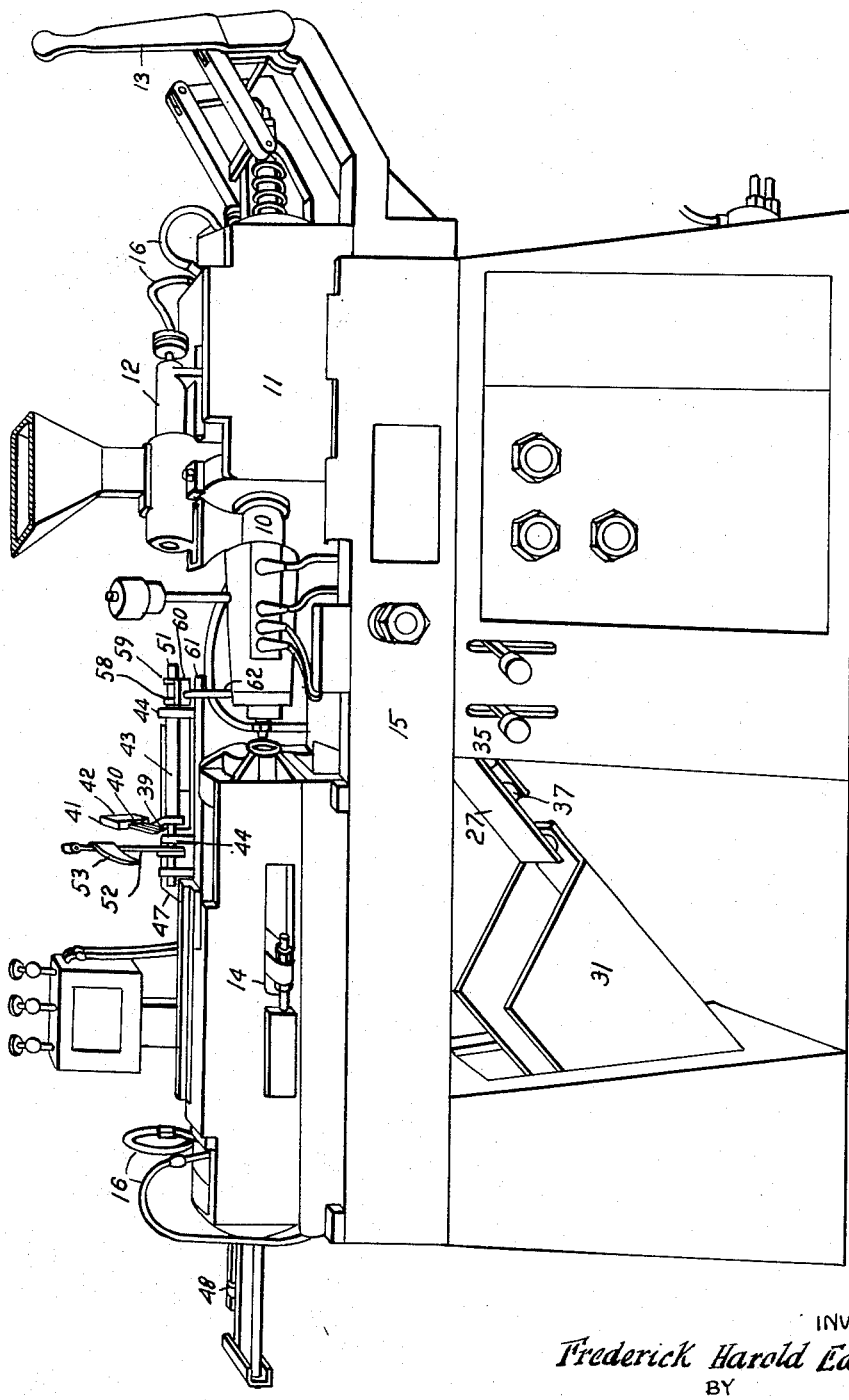

Aug. 21, 1956  F. H. EDWARDS  2,759,221
INJECTION (PLASTIC) MOULDING MACHINES
Filed July 8, 1952  5 Sheets-Sheet 1

INVENTOR
Frederick Harold Edwards
BY
Kane, Dalsimer and Kane
ATTORNEYS.

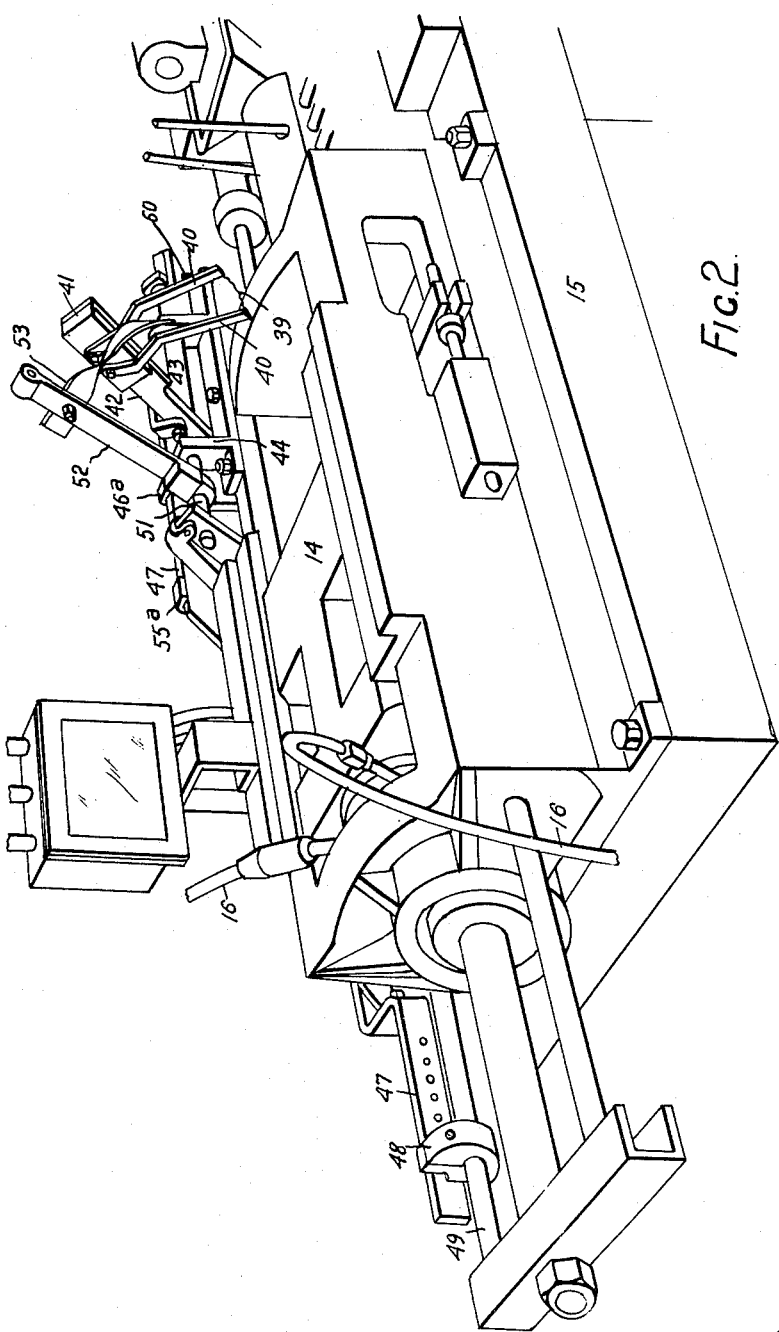

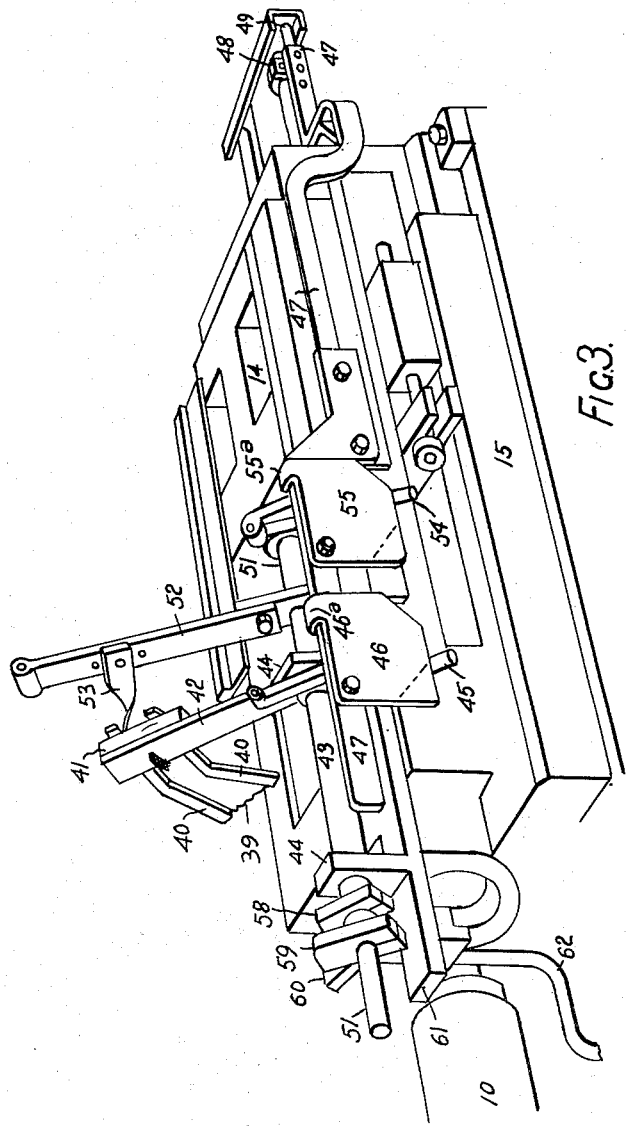

Aug. 21, 1956 F. H. EDWARDS 2,759,221
INJECTION (PLASTIC) MOULDING MACHINES
Filed July 8, 1952 5 Sheets-Sheet 4
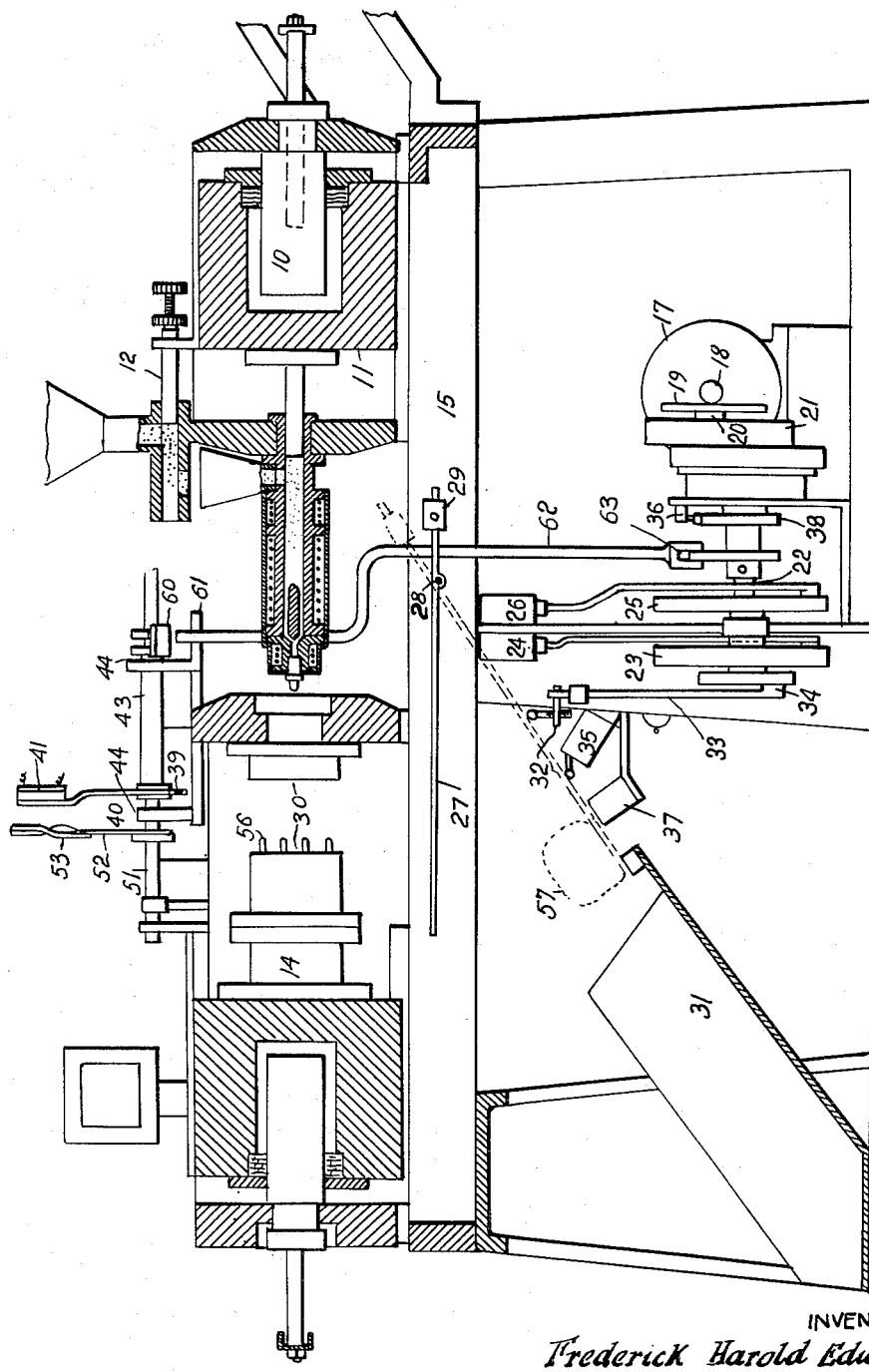
INVENTOR
*Frederick Harold Edwards*
BY
*Kane, Dalsimer and Kane*
ATTORNEYS Aug. 21, 1956  F. H. EDWARDS  2,759,221
INJECTION (PLASTIC) MOULDING MACHINES
Filed July 8, 1952  5 Sheets-Sheet 5
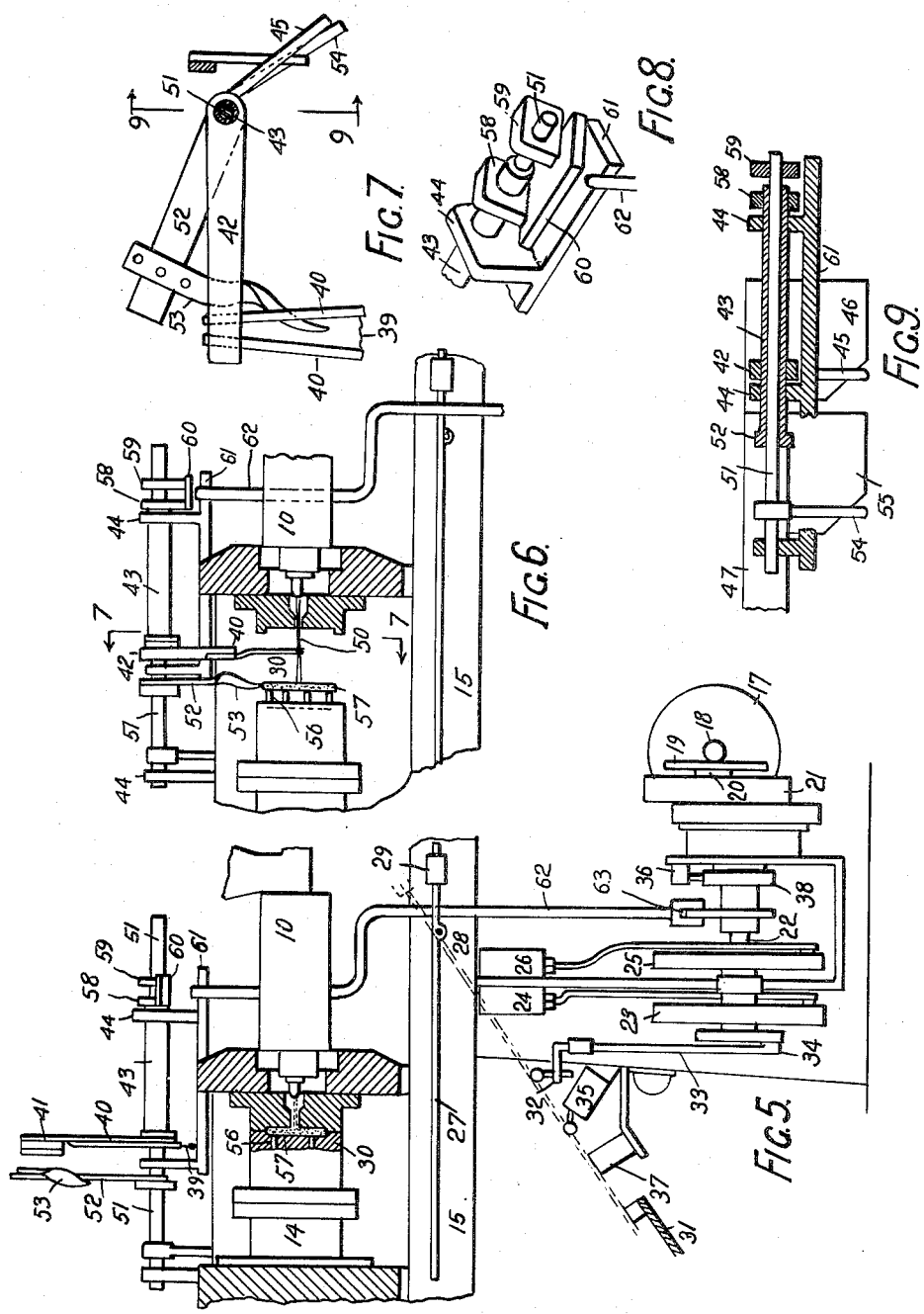
INVENTOR
Frederick Harold Edwards
BY
Kane, Dalsimer and Kane
ATTORNEYS

United States Patent Office 2,759,221
Patented Aug. 21, 1956

2,759,221

INJECTION (PLASTIC) MOULDING MACHINES

Frederick Harold Edwards, Richmond, Victoria, Australia, assignor to Pierwood Plastics Limited, Chatswood, near Sydney, New South Wales, Australia, a corporation of New South Wales Application July 8, 1952, Serial No. 297,726

3 Claims. (Cl. 18—30)

This invention relates to injection (plastic moulding machines of the type having a die and mechanism to open and close the die and means to inject plastic material into the closed die. The invention has been devised to provide improvements in such machines whereby the operation of the machine is made fully automatic. That is to say that when adjusted for a particular moulding operation and so long as moulding material and power are supplied to the machine it will continue to mould the particular plastic articles.

One feature of the invention is that, when a moulding operation has been completed and the die opened, the machine stops and it will not start again to commence a new moulding operation until the previously moulded article has been ejected from the machine. After the moulded article has been ejected the machine starts the next moulding operation automatically.

Another feature of the invention is the provision of means to ensure that a moulded article will not stick in the machine when the die is opened.

According to this invention the automatic operation of the machine is effected by the provision of a balanced plate (called herein a balance trap) adapted to be moved to a position to receive a moulded article ejected from the die and in so moving to actuate means to open a switch in a control circuit which, when the machine stops by the operation of a second switch in said circuit and actuated by the machine, will prevent the machine commencing another moulding operation until a moulded article ejected from the machine moves the balance trap back to its original position, when the said first switch is closed to start the machine again. Means are incorporated to hold the balance trap in such original position during the moulding operation.

A sprue severing device supported above the die is released by the die opening mechanism when the die is opened and it then severs any sprue connecting the moulded article with plastic material remaining in the injection nozzle of the machine. Means are incorporated and operable by devices controlling the cycle of operations of the machine to return the sprue severing device to its original position.

In addition to the sprue severing device, an ejector device operable in the same manner as said sprue severing device is provided to remove a moulded article from the die.

The invention also includes devices to control the cycle of operations of the machine in combination with the balance trap, the sprue cutter device and the means to remove a moulded article from the die.

The improvements are described in detail with reference to the annexed drawings wherein Fig. 1 is a perspective view of an injection moulding machine incorporating the improvements; Figs. 2 and 3 are enlarged perspective views of the locking member end of the machine showing the sprue cutter, the moulded article ejector and part of the actuating mechanism therefor; Fig. 4 is a longitudinal central sectional elevation of the machine with the mould open and a moulded article sliding down the balance trap; Figs. 5 and 6 are fragmentary longitudinal central sectional elevations showing respectively the mould closed in a moulding operation and the mould open with the sprue cutter and the ejector in retracted and operative positions respectively; Fig. 7 is a sectional elevation on line 7—7 of Fig. 6; Fig. 8 is a fragmentary perspective view on line 8—8 of Fig. 6; Fig. 9 is a sectional elevation on line 9—9 of Fig. 7.

The ram 10, its mounting 11, the feed ram 12, and hand gear 13 for movement of the mounting in the set-up of the die and to purge the die are of conventional construction. The stripping side of the die is incorporated with the ram. Likewise the "locking member" of the machine and its associated parts, indicated generally by the reference 14, are of conventional construction. They are erected on a conventional base 15 and are not described in detail. The fixed part of the die and, if used, the die ejector pins are incorporated with the locking member. The pipes 16 indicate that reciprocation of these parts in the present machine is effected by hydraulic power. Other known power means frequently used in the art may be employed to actuate these parts.

An electric motor 17 drives through a roller 18 a friction disc 19 which is connected by shaft 20 to a reduction-gear indicated generally by the reference 21. The time for one cycle of operation of the machine is regulated by adjusting the position of the roller 18 relative radially to the disc 19. For this purpose the motor is slidably mounted on its base and means are provided to move it along the base, and to hold it in a selected position. Braking means, for example fan blades, are incorporated to stop the motor at a determined interval of time after the current to the motor has been switched off. The reduction gear 21 drives a cam shaft 22. There are several cams on this shaft which with the electrical gear (described later) actuate in some movements the mechanism of the present invention, and synchronise the movements of the hydraulically actuated parts therewith. The cams will be referred to in association with the function they perform.

Cam 23 operates a valve indicated at 24 in the hydraulic system which controls the operation of the locking member 14. Cam 25 operates a valve indicated at 26 also in the hydraulic system which controls the movement of the mounting 11 which in turn operates the feed ram 12.

A balance trap 27, is pivotally mounted as at 28 in the machine and balanced by weight 29. It is positioned under the die, which is indicated at 30, to receive moulded articles ejected from the die and by tipping to discharge said articles into chute 31. The position of the weight 29 is adjusted so that the balance trap will only tip when a predetermined weight of moulded article is deposited on it.

The balance trap is raised to receiving position by crosshead 32 on pitman 33 connected to crank pin 34 on the shaft 22. When a moulding operation is nearing completion the balance trap is raised and it opens switch 35 in an electric circuit which, when closed again, functions to start the motor 17 after a second switch 36, which is actuated subsequently, stops the motor. The switches 35 and 36 are in parallel. When the crosshead 32 moves clear of the balance trap and the predetermined weight of moulded article falls on the balance trap, the latter tips to discharge position where it is held by the attraction of magnet 37. This movement closes the switch 35 for the next cycle of moulding operations. The magnet holds the balance trap until the crosshead moves upwardly again.

The switch 36 is actuated by cam 38. The cam is adjusted so that the switch will stop the motor 17 at such interval of time after the switch 35 is opened as is necessary to complete the cycle of a moulding operation. When the motor 17 is started by closing of switch 35, the movement of the cam 38 closes the switch 36.

When an article is moulded a sprue usually connects the article with the plastic material remaining in the injection nozzle at the completion of a moulding operation. It is necessary to sever this sprue in order that the moulded article can drop on to the balance trap. For this purpose a Nicrome or other electrically heated wire 39 is connected between terminal bars 40 which are mounted on insulating block 41 on an arm 42 juxtaposed the gap between the die when in the open position. The arm 42 is fixed to one member 43 of a compound shaft mounted in bearings 44 on the machine. A lever extension 45 of the arm 42 is positioned in actuating relationship with a trip plate 46 pivoted by one corner on bar 47 which is longitudinally slidably mounted on the machine and connected as at 48 to one of the reciprocating guide rod components 49 of the locking member 14. The trip plate has a hook end 46a which is adapted to take on the bar 47 and so support the plate in its designed position.

The trip plate 46 is positioned so that as the locking member moves towards die open position the trip plate 46 moves clear of the lever extension 45 and permits the arm 42 to fall. At this time the moulded article has been ejected from the die and if it is hanging by a sprue—indicated at 50—the heated Nicrome wire 39 will sever the sprue. The manner of raising the arm 42 will be described later.

The other member 51 of the compound shaft has an arm 52 thereon and there is an ejector member 53 pivoted on the arm. A lever extension 54 of the arm 52 is positioned in actuating relationship with a trip plate 55 pivoted on the bar 47 in such position in relation to the trip plate 46 that the arm 52 will fall after the arm 42 falls and the ejector will then clear the moulded article from the die or die ejector pins 56 (where such pins are incorporated with the die) in the event that the moulded article adheres to the die or to said pins. The moulded article is indicated at 57. This trip plate also has a hook end 55a adapted to take on the bar 47.

The shaft member 43 has a crank 58 thereon and the shaft member 51 has a similar crank 59. There is a plate 60 fixed to crank 58; it extends across the track of crank 59 and is juxtaposed a stop plate 61. The maximum fall of arms 42 and 52 is limited by the plate 60 butting the stop plate 61. A push rod 62 actuated by cam 63 on the cam shaft 22 engages the plate 60 and lifts the arms 42 and 52 when the parts associated therewith have performed their functions in the timed sequence of the cycle of operations. As the arms are elevated the trip plates 46 and 55 are moved by the return of the locking member (to die closing position) to lift over and engage the lever extensions 45 and 54 and so hold the arms elevated until the dies are opened again.

The above described parts make the operation of the machine automatic and it will work so long as power and material are supplied to it providing, of course, the machine is not stopped by the controls described due to a fault developing in the cycle of operations.

It will be seen that power is applied to the machine to commence a moulding cycle through the operation of the switch 35 by the movement of the balance trap 27. It is within the scope of this invention to utilize the sprue severing device or the ejector device to actuate means which will cause the machine to start a new moulding operation after a previously moulded article has been ejected from the machine.

In such a continuously operating machine it is necessary to provide additional controls to stop the machine in the event of a leakage in the hydraulic system and/or in the water cooling system. For this purpose the hydraulic supply tank incorporates a motor control switch which is brought into operation in the event that the supply falls below a determined level. Under the mounting 11 of the injection end of the machine a drip tray is positioned. There is a float in the tray operatively connected to a switch in the hydraulic pump motor circuit. In the event of oil or water leaking from the operative components this switch is actuated by the float to stop the motor.

While these controls last mentioned are important in the effective automatic operation of the machine they are of conventional construction and for such reason are not described in detail.

I claim:

1. In an injection moulding machine of the type having a die and mechanism to close and open the die and having means to inject plastic material into the closed die, the provision of a balance trap consisting of a plate pivotally mounted in the machine and balanced by a weight adjustably positioned thereon, a device to hold the balance trap in tipping position, when moved to such position by an article deposited thereon, means actuated by devices controlling the cycle of operations of the machine to raise the balance trap to receiving position, a switch in an electric circuit supplying power to the said devices controlling the cycle of operations of the machine, said switch being constructed and arranged to be opened by the raising of the balance trap and to be closed by said balance trap when it falls, a second switch in parallel in said electric circuit adapted to be actuated by the said devices controlling the operation of the machine to cut off power to said devices.

2. In an injection moulding machine of the type having a die and mechanism to close and open the die and having means to inject plastic material into the closed die, the provision of means operable by movement of the die when opening to sever the sprue connecting a moulded article with plastic material remaining in the injection nozzle of the machine, said means consisting of an arm fixed to a shaft in bearings on the machine, terminal bars on said arm, an electrically heated wire connected between said terminal bars, fixed to a shaft in bearings on the machine, a lever extension of said arm positioned to hold said arm clear of the die by contact with a trip plate connected to and adapted to be moved by a locking member to clear said lever extension and allow said arm to fall, devices controlling the cycle of operations, a crank on said shaft and a push rod in register therewith and operatively connected to a cam on a cam shaft adapted to be actuated by said devices to lift the sprue severing means clear of the die, a balance trap adapted to be moved from an original position to a position to receive a moulded article ejected from the die and in so moving to actuate means which will prevent the machine commencing another moulding operation until a moulded article ejected from the die moves said balance trap to its original position when said means are actuated to start the machine again, means actuated by said cycle controlling devices to move said balance trap from its original position to its receiving position and means to hold the balance trap in the original position during a moulding operation.

3. In an injection moulding machine of the type having a die and mechanism to close and open the die and having means to inject plastic material into the closed die, the provision of ejector means to remove an article from the die consisting of an ejector member on an arm fixed to a shaft in bearings on the machine, a lever extension of said arm positioned to hold said arm clear of the die by contact with a trip plate connected to and adapted to be moved by a locking member to clear said lever extension and allow said arm to fall, a crank on said shaft and a push rod in register therewith operatively connected to a cam on a cam shaft adapted to be actuated by said devices controlling the cycle of operations of said machine to lift the ejector means clear of the die.

References Cited in the file of this patent

UNITED STATES PATENTS

| | | |
|---|---|---|
| 2,242,189 | Zelov et al. | May 13, 1941 |
| 2,262,615 | Lester | Nov. 11, 1941 |
| 2,526,650 | Gaibel | Oct. 24, 1950 |
| 2,612,666 | McGarigal | Oct. 7, 1952 |
| 2,613,395 | Massler | Oct. 14, 1952 |